(12) United States Patent
Wang

(10) Patent No.: US 10,379,696 B2
(45) Date of Patent: Aug. 13, 2019

(54) METHOD AND APPARATUS FOR DISPLAYING POPUP WINDOW MESSAGE

(71) Applicant: TENCENT TECHNOLOGY (SHENZHEN) COMPANY LIMITED, Shenzhen (CN)

(72) Inventor: Yulong Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 334 days.

(21) Appl. No.: 15/229,963

(22) Filed: Aug. 5, 2016

(65) Prior Publication Data
US 2016/0342285 A1 Nov. 24, 2016

Related U.S. Application Data

(63) Continuation of application No. PCT/CN2015/082640, filed on Jun. 29, 2015.

(30) Foreign Application Priority Data

Jun. 30, 2014 (CN) .......................... 2014 1 0306413

(51) Int. Cl.
G06F 9/451 (2018.01)
H04L 12/58 (2006.01)
G06F 3/0481 (2013.01)

(52) U.S. Cl.
CPC ............ *G06F 3/0481* (2013.01); *G06F 9/451* (2018.02); *H04L 51/24* (2013.01); *H04L 51/26* (2013.01)

(58) Field of Classification Search
CPC ....... G06F 3/0481; G06F 9/451; H04L 51/26; H04L 51/24

USPC ......................................................... 715/808
See application file for complete search history.

(56) References Cited

U.S. PATENT DOCUMENTS

| 6,239,796 | B1 * | 5/2001 | Alexander | ............ | G06F 3/0481 |
| | | | | | 715/781 |
| 7,155,729 | B1 * | 12/2006 | Andrew | .............. | G06F 9/44505 |
| | | | | | 719/318 |
| 2001/0054035 | A1 * | 12/2001 | Lee | .................... | G06F 17/30864 |
| 2006/0224944 | A1 | 10/2006 | Baek et al. | | |
| 2007/0130398 | A1 * | 6/2007 | Halpin | .................. | G06F 1/1616 |
| | | | | | 710/62 |

(Continued)

FOREIGN PATENT DOCUMENTS

| CN | 101441559 A | 5/2009 |
| CN | 102147736 A | 8/2011 |

OTHER PUBLICATIONS

The World Intellectual Property Organization (WIPO) International Search Report for PCT/CN2015/082640 dated Oct. 9, 2015 pp. 1-3.

*Primary Examiner* — Jennifer N To
*Assistant Examiner* — Beau D Spratt
(74) *Attorney, Agent, or Firm* — Anova Law Group, PLLC

(57) ABSTRACT

A method for displaying a popup window message includes: acquiring a trigger condition of each popup window message that is not displayed; separately setting, according to the trigger condition of each popup window message that is not displayed, a priority level of each popup window message that is not displayed; and loading a popup window message with a highest priority level into a popup window, and displaying the popup window.

12 Claims, 4 Drawing Sheets

(56) References Cited

U.S. PATENT DOCUMENTS

| | | | |
|---|---|---|---|
| 2008/0133748 A1* | 6/2008 | Nicholas | G06F 3/04812 709/224 |
| 2008/0195964 A1* | 8/2008 | Randell | G06Q 10/06 715/772 |
| 2009/0150507 A1* | 6/2009 | Davis | H04L 51/14 709/207 |
| 2010/0227651 A1* | 9/2010 | Kim | G06F 3/1423 455/566 |
| 2011/0138444 A1* | 6/2011 | Kang | G06F 21/10 726/3 |
| 2011/0283226 A1 | 11/2011 | Basson et al. | |
| 2012/0166076 A1* | 6/2012 | Hardy | G01C 21/3415 701/414 |
| 2012/0198002 A1* | 8/2012 | Goulart | H04L 51/36 709/206 |
| 2014/0189585 A1* | 7/2014 | Brush | B60R 16/023 715/808 |
| 2016/0269540 A1* | 9/2016 | Butcher | H04M 1/72569 |

\* cited by examiner

METHOD AND APPARATUS FOR DISPLAYING POPUP WINDOW MESSAGE

CROSS-REFERENCES TO RELATED APPLICATIONS

This application claim priority of PCT Patent Application No. PCT/CN2015/082640, filed on Jun. 29, 2015, which claims priority to Chinese Patent Application No. 2014103064132, entitled "Method and Apparatus for Displaying Popup Window Message," filed on Jun. 30, 2014, the entire contents of both of which are incorporated herein by reference.

FIELD OF THE TECHNOLOGY

The present disclosure relates to the field of computer technologies, and in particular, to a method and an apparatus for displaying a popup window message.

BACKGROUND OF THE DISCLOSURE

A popup window is a user interface (UI) component that is often used during development and application, which displays a popup window message in a popup manner and performs an interactive operation with a user. For example, when a user closes a file, a mobile terminal pops up a popup window. A popup window message displayed by the popup window may include a prompt message "Do you want to close this file", an "OK" button, and a "Cancel" button. The user can click a button to close the file or cancel closing the file.

When there is a popup window message on a mobile terminal, the mobile terminal needs to display the popup window message to a user, for the user to view the popup window message and perform an interactive operation. As a mobile terminal has a small screen size, the mobile terminal can only display one popup window message each time. Currently, a mobile terminal may display a popup window message through the following methods. Specifically, a mobile terminal receives a popup window message sent by a server, or a mobile terminal receives a command that triggers a popup window message, and inserts the popup window message to the end of a message queue for waiting. The message queue is a first-in-first-out queue. A popup window message at the first place of the queue has waited for a longest period of time. The mobile terminal dequeues the popup window message at the first place of the message queue, creates a popup window, loads the dequeued popup window message into the created popup window, and displays the popup window to a user.

However, a popup window message is often displayed according to a waiting time of the popup window message, and a popup window message that has waited for a longest period time is displayed first. However, some popup window messages are relatively important. For example, a popup window message such as an award prompt may be automatically destroyed after being displayed for a short time. If these popup window messages have waited for a short period of time, these important popup window messages with strong time effectiveness may not be displayed in time, leading to loss of these important popup window messages.

SUMMARY

A method for displaying a popup window message includes acquiring a trigger condition of each popup window message that is not displayed; separately setting, according to the trigger condition of each popup window message that is not displayed, a priority level of each popup window message that is not displayed; and loading a popup window message with a highest priority level into a popup window, and displaying the popup window.

An apparatus for displaying a popup window message includes an obtaining module, configured to acquire a trigger condition of each popup window message that is not displayed; a setting module, configured to separately set, according to the trigger condition of each popup window message that is not displayed, a priority level of each popup window message that is not displayed; and a display module, configured to load a popup window message with a highest priority level into a popup window, and display the popup window.

BRIEF DESCRIPTION OF THE DRAWINGS

FIG. 2-1 is a flowchart of a method for displaying a popup window message according to Embodiment 2 of the present disclosure;

FIG. 2-2 is a schematic diagram of an interface for displaying a popup window message according to Embodiment 2 of the present disclosure;

DESCRIPTION OF EMBODIMENTS

To make the objectives, technical solutions and advantages of the present disclosure clearer, the following describes implementation manners of the present disclosure in further detail with reference to accompanying drawings.

Embodiment 1

Figure 1:
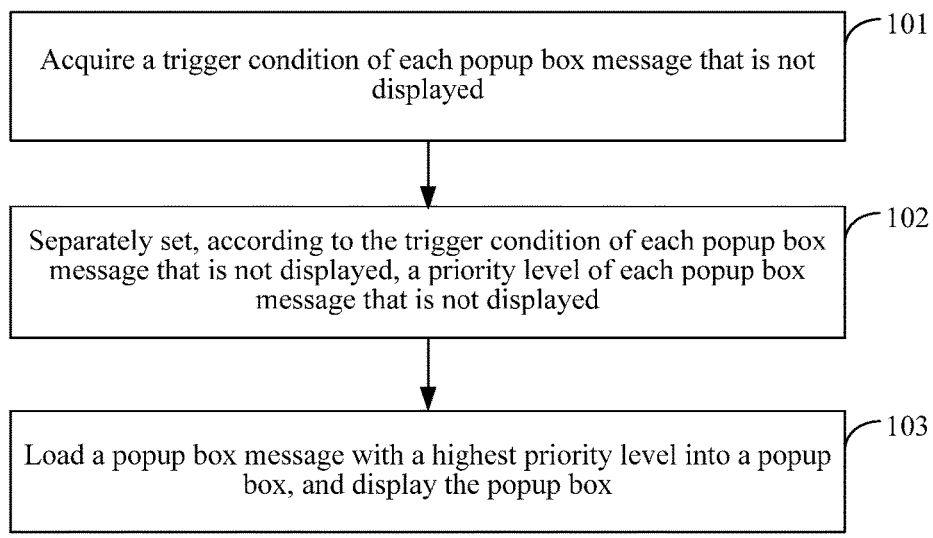
FIG. 1 is a flowchart of a method for displaying a popup window message according to Embodiment 1 of the present disclosure.

Referring to FIG. 1, this embodiment of the present disclosure provides a method for displaying a popup window message, including:

Step 101: Acquire a trigger condition of each popup window message that is not displayed.

Step 102: Separately set, according to the trigger condition of each popup window message that is not displayed, a priority level of each popup window message that is not displayed.

Step 103: Load a popup window message with a highest priority level into a popup window, and display the popup window.

Preferably, the separately setting, according to the trigger condition of each popup window message that is not displayed, a priority level of each popup window message that is not displayed includes acquiring, according to the trigger condition of each popup window message that is not displayed, at least one type parameter corresponding to each popup window message that is not displayed; and separately setting, according to the at least one type parameter corresponding to each popup window message that is not displayed, a priority level of each popup window message that is not displayed.

Preferably, the acquiring, according to the trigger condition of each popup window message that is not displayed, at least one type parameter corresponding to each popup window message that is not displayed includes:

acquiring, from a correspondence between trigger conditions and type parameters and according to the trigger condition of each popup window message that is not displayed, at least one type parameter corresponding to each popup window message that is not displayed.

Preferably, the separately setting, according to the at least one type parameter corresponding to each popup window message that is not displayed, a priority level of each popup window message that is not displayed includes acquiring a corresponding priority level from a correspondence between type parameters and priority levels and according to at least one type parameter that corresponds to a first popup window message, the first popup window message being any popup window message among the popup window messages that are not displayed; and setting the acquired priority level as a priority level of the first popup window message.

Preferably, the loading a popup window message with a highest priority level into a popup window, and displaying the popup window includes acquiring a popup window message with a highest priority level, and a display level relationship between the popup window message with the highest priority level and a currently displayed interface; creating a popup window, and loading the popup window message into the created popup window; and displaying the popup window according to the display level relationship between the popup window message with the highest priority level and the currently displayed interface.

Further, after the loading a popup window message with a highest priority level into a popup window, and displaying the popup window, the method further includes receiving a request for accessing the popup window, the request being sent by a process communicating with the popup window; viewing a display state of the popup window; and determining, according to the display state of the popup window, whether to allow the process to access the popup window.

Further, after the loading a popup window message with a highest priority level into a popup window, and displaying the popup window, the method further includes recording a display state of the popup window; and monitoring the popup window in real time, and updating the display state of the popup window when it is detected that the state of the popup window changes.

In this embodiment of the present disclosure, a trigger condition of each popup window message that is not displayed is acquired; a priority level of each popup window message that is not displayed is set separately according to the trigger condition of each popup window message that is not displayed; and a popup window message with a highest priority level is loaded into a popup window, and the popup window is displayed. Because a priority level of each popup window message that is not displayed is set according to a trigger condition of each popup window message, it is ensured that a more important popup window message has a higher priority level. Then, a popup window message with a highest priority level is displayed, so that one most important popup window message may be selected from popup window messages that are not displayed, and the most important popup window message is displayed preferentially.

Embodiment 2

This embodiment of the present disclosure provides a method for displaying a popup window message.

Before a popup window currently displayed on a terminal is destroyed, each time the terminal receives a popup window message, the terminal inserts the popup window message into a message queue. When the terminal needs to display a popup window message, the terminal may select one most important popup window message from the message queue according to the method provided by this embodiment of the present disclosure, and display the most important popup window message.

Figures 1, 2:
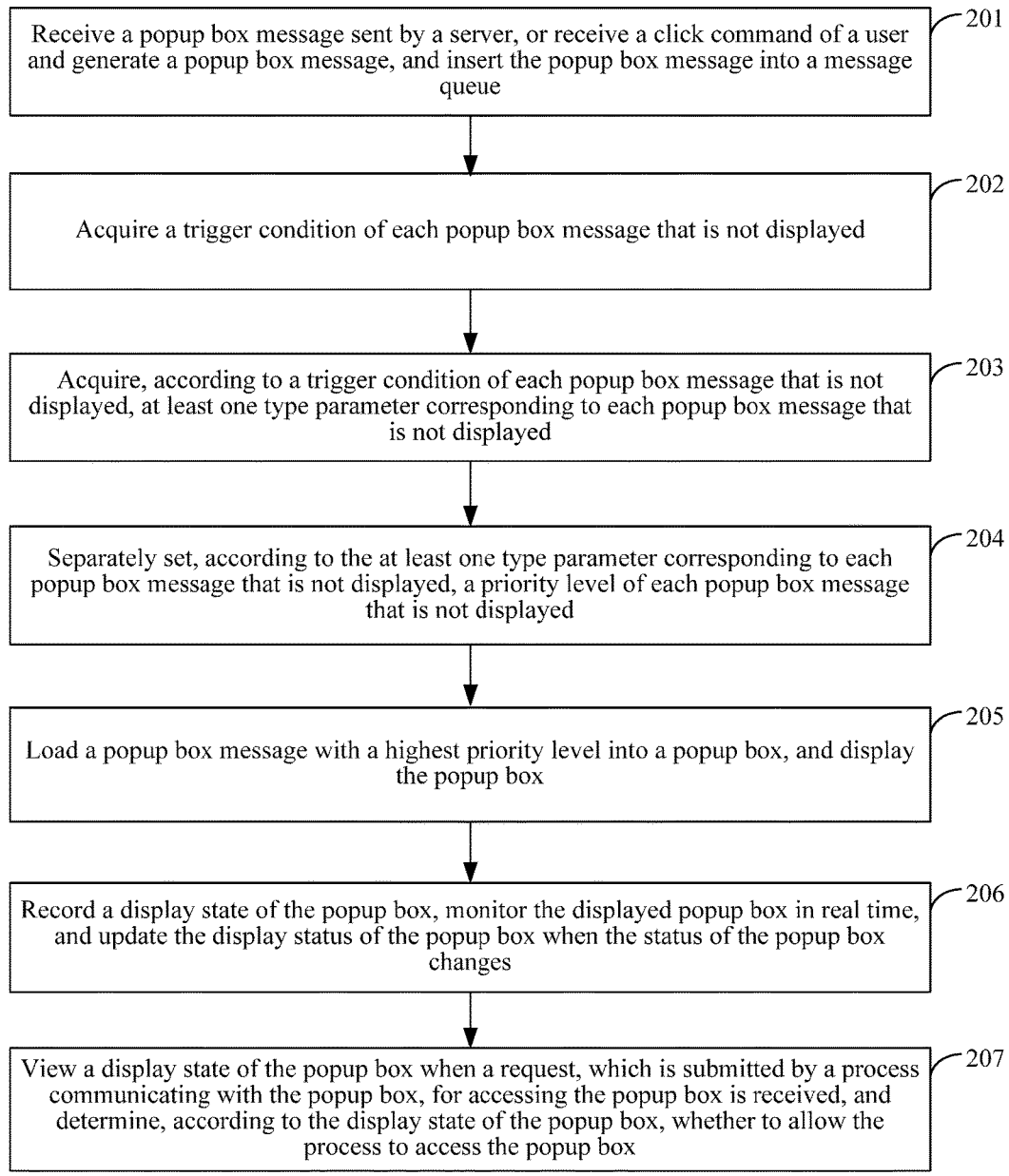
Figure 2:
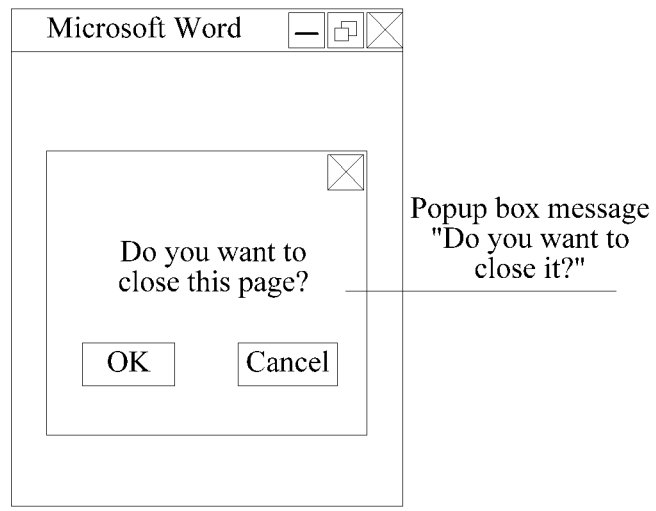

Referring to FIG. 2-1, the method specifically includes:

Step 201: Receive a popup window message sent by a server, or receive a click command of a user and generate a popup window message, and insert the popup window message into a message queue.

Popup window messages may be classified into popup window messages triggered by the foreground and popup window messages sent by the background, according to different sources of the popup window messages.

The popup window message triggered by the foreground is a popup window message that is generated when a terminal receives a command triggered by a user clicking an interface on a page. When the user clicks some interfaces on a page to trigger a click command, the terminal receives the click command triggered by the user, and then generates a popup window message. The terminal uses the received click command as a trigger condition of the popup window message, and stores the trigger condition of the popup window message and the popup window message into a correspondence between trigger conditions and popup window messages. For example, when a terminal receives a close command triggered by a user clicking a close button on a page, the terminal generates a popup window message "Do you want to close it?", uses the received click command "close command" as a trigger condition of the popup window message "Do you want to close it?", and stores the click command "close command" and the popup window message "Do you want to close it?" into a correspondence between trigger conditions and popup window messages as shown in Table 1.

TABLE 1

| Trigger condition | Popup window message |
| --- | --- |
| Submit an order request | Confirm the order |
| Notification | Notification message |
| Close command | Do you want to close it? |
| ...... | ...... |

The popup window message sent by the background is a popup window message that is sent by a server. During communication between a terminal and a server, a user submits a request to the terminal through some interfaces, and the terminal receives the request submitted by the user and sends information to the server. The server generates a popup window message according to the information sent by the terminal, and sends the popup window message to the terminal. The terminal receives the popup window message sent by the server, uses the request submitted by the user through some interfaces as a trigger condition of the popup window message, and stores the trigger condition of the popup window message and the popup window message into a correspondence between trigger conditions and popup window messages. For example, a terminal receives an order submission request that is triggered by a user clicking an order submission button, sends order information to a server, and receives a popup window message "confirm the order" that is returned by the server according to the order information, uses the order submission request as a trigger condition of the popup window message, and stores the order submission request and the popup window message "confirm the order" into the correspondence between trigger conditions and popup window messages as shown in Table 1.

In addition, a server may further actively push a popup window message to a terminal. Before a server pushes a popup window message, the server allocates a message identifier to the popup window message, and attaches the allocated message identifier to the popup window message. The terminal receives the popup window message that is pushed by the server, acquires a message identifier of the popup window message from the popup window message, uses the acquired message identifier as a trigger condition of the popup window message, and stores the trigger condition of the popup window message and the popup window message into a correspondence between trigger conditions and popup window messages. For example, a terminal receives a popup window message "notification message" that is pushed by a server, acquires a message identifier "notification" from the popup window message "notification message", uses the acquired message identifier "notification" as a trigger condition of the popup window message, and stores the message identifier "notification" and the popup window message "notification message" into the correspondence between trigger conditions and popup window messages as shown in Table 1.

When the terminal receives a popup window message that is sent by the server or generates a popup window message according to a click command received from a user, the terminal inserts the popup window message to the end of the message queue for waiting. The message queue is a first-in-first-out queue, and a popup window message located at the first place of the queue has waited for a longest period of time.

For example, when a terminal receives a submission command triggered by a user clicking an order submission button, the terminal sends order information to a server. The terminal receives a popup window message "confirm the order" that is returned according to the order information by the server, and inserts the popup window message "confirm the order" to the end of a queue 1 shown below.

| Queue 1 |
| --- |
| Confirm the order |

For another example, a terminal receives a popup window message "notification message" pushed by a server, and inserts the popup window message "notification message" to the end of a queue 2 shown below.

| Queue 2 | |
| --- | --- |
| Notification message | Confirm the order |

For still another example, a terminal receives a close command triggered by a user clicking a close button, generates a popup window message "Do you want to close it?", and inserts the popup window message "Do you want to close it?" to the end of a queue 3 shown below.

| Queue 3 | | |
| --- | --- | --- |
| Do you want to close it? | Notification message | Confirm the order |

After the received or generated popup window message is inserted into the message queue through the above step 201, a priority level is set, through the following steps 202 to 204, for each popup window message that is not displayed in the message queue.

Step 202: Acquire a trigger condition of each popup window message that is not displayed.

Specifically, a popup window message that is not displayed and located at the first place of the message queue is dequeued, and a trigger condition of the popup window message that is not displayed is acquired from a stored correspondence between popup window messages and trigger conditions and according to the popup window message that is not displayed.

For each remaining popup window message that is not displayed in the message queue, a trigger condition thereof is acquired according to the above operation with respect to the popup window message.

For example, the popup window message "confirm the order" located at the first place of the message queue shown in the queue 3 is dequeued. According to the popup window message "confirm the order" that is not displayed, a trigger condition of the popup window message "confirm the order" that is not displayed is acquired from the stored correspondence between popup window messages and trigger conditions as shown in Table 1. The trigger condition is "order submission request". A message queue after the popup window message "confirm the order" is dequeued is as shown in a queue 4.

| Queue 4 | |
| --- | --- |
| Do you want to close it? | Notification message |

For another example, the popup window message "notification message" located at the first place of the message queue as shown in the queue 4 is dequeued. According to the popup window message "notification message" that is not displayed, a trigger condition of the popup window message "notification message" that is not displayed is acquired from the stored correspondence between popup window messages and trigger conditions as shown in Table 1. The trigger condition is "notification". A message queue after the popup window message "notification message" is dequeued is as shown in a queue 5.

| Queue 5 |
| --- |
| Do you want to close it? |

For another example, the popup window message "Do you want to close it?" located at the first place of the message queue as shown in the queue 5 is dequeued. According to the popup window message "Do you want to close it?" that is not displayed, a trigger condition of the popup window message "Do you want to close it?" that is not displayed is acquired from the stored correspondence between popup window messages and trigger conditions as shown in Table 1. The trigger condition is "close command". A message queue after the popup window message "Do you want to close it?" is dequeued is as shown in a queue 6.

---
Queue 6
---

Step 203: Acquire, according to the trigger condition of each popup window message that is not displayed, at least one type parameter corresponding to each popup window message that is not displayed.

Popup window messages may be classified into different categories according to different classification standards. For example, the popup window messages may be classified into two categories, that is, modal popup windows and non-modal popup windows, according to display forms of popup window messages, or popup windows triggered by the foreground and popup windows sent by the background according to sources of popup window messages, or popup windows with time effectiveness and popup windows without time effectiveness according to whether popup window messages have a valid time or not. A type parameter is used for indicating a category of a popup window message, which may include modality, non-modality, foreground-triggered, background-sent, time effectiveness or non-time-effectiveness, and the like.

A popup window message with time effectiveness may be automatically destroyed after being displayed for a preset time.

A skilled person sets at least one type parameter that corresponds to a different trigger condition in an installation package of an application. A correspondence between trigger conditions and type parameters as shown in Table 2 is stored when the application is installed in the terminal.

TABLE 2

| Trigger condition | Type parameter |
| --- | --- |
| Submit an order request | Non-modality, background-sent, non-time-effectiveness |
| Notification | Non-modality, background-sent, time effectiveness |
| Click a close button | Modality, foreground-triggered, non-time-effectiveness |
| . . . . . . | . . . . . . |

This step is specifically as follows: acquiring, according to the acquired trigger condition of each popup window message that is not displayed, a type parameter corresponding to each popup window message that is not displayed from a stored correspondence between trigger conditions and type parameters.

For example, according to the acquired trigger condition "order submission request" of the popup window message "confirm the order", type parameters "non-modality, background-sent and non-time-effectiveness" corresponding to the popup window message "confirm the order" are acquired from the stored correspondence between trigger conditions and type parameters as shown in Table 2.

For another example, according to the acquired trigger condition "notification" of the popup window message "notification message", type parameters "non-modality, background-sent and time effectiveness" corresponding to the popup window message "notification message" are acquired from the stored correspondence between trigger conditions and type parameters as shown in Table 2.

For still another example, according to the acquired trigger condition "click a close button" of the popup window message "Do you want to close it?", type parameters "modality, foreground-triggered and non-time-effectiveness" corresponding to the popup window message "Do you want to close it" are acquired from the stored correspondence between trigger conditions and type parameters as shown in Table 2.

Step 204: Separately set, according to the at least one type parameter corresponding to each popup window message that is not displayed, a priority level of each popup window message that is not displayed.

A skilled person specifies a priority level that corresponds to each type parameter in advance, and sets a correspondence between type parameters and priority levels in an installation package of an application. The correspondence between type parameters and priority levels is stored when the application is installed in a terminal.

Different type parameters have different importance degrees. For example, a popup window message with time effectiveness is more important than a popup window message without time effectiveness, and a modal popup window is more important than a non-modal popup window. Therefore, when a skilled person specifies a priority level that corresponds to each type parameter, a high priority level is set for an important type parameter, so as to ensure that a more important popup window message has a higher priority level.

It may be specified in advance that, if a value of a priority level is larger, the priority level is higher; or if a value of a priority level is smaller, the priority level is higher.

This step is specifically as follows: assuming that a first popup window message is any popup window message among the popup window messages that are not displayed, acquiring a priority level corresponding to each type parameter in the at least one type parameter from a stored correspondence between type parameters and priority levels and according to at least one type parameter that corresponds to the first popup window message, and calculating a priority level of the first popup window message by using a preset calculation method and according to the acquired priority level that corresponds to each type parameter.

The preset calculation method may be adding or multiplying the acquired priority levels that correspond to the type parameters.

For each remaining popup window message that is not displayed, a priority level thereof is set according to the above operation with respect to the first popup window message.

For example, assuming that a terminal has stored in advance a correspondence between type parameters and priority levels as shown in Table 3, according to type parameters "non-modality, background-sent, and non-time-effectiveness" that correspond to the popup window message "confirm the order", a priority level 2 corresponding to the type parameter "non-modality", a priority level 2 corresponding to the type parameter "background-sent" and a priority level 2 corresponding to the type parameter "non-time-effectiveness" are acquired from the correspondence between type parameters and priority levels as shown in Table 3. Assuming that a preset calculation method is adding priority levels that correspond to acquired type parameters, the acquired priority level 2 corresponding to the type parameter "non-modality", the acquired priority level 2 corresponding to the type parameter "background-sent" and the acquired priority level 2 corresponding to the type parameter "non-time-effectiveness" are added up, to obtain a priority level 6 of the popup window message "confirm the order".

TABLE 3

| Type parameter | Priority level |
|---|---|
| Time effectiveness | 1 |
| Non-time-effectiveness | 2 |
| Modality | 1 |
| Non-modality | 2 |
| Foreground-triggered | 1 |
| Background-sent | 2 |
| ...... | ...... |

For another example, according to type parameters "non-modality, background-sent, and time effectiveness" that correspond to the popup window message "notification message", a priority level 2 corresponding to the type parameter "non-modality", a priority level 2 corresponding to the type parameter "background-sent" and a priority level 1 corresponding to the type parameter "time effectiveness" are acquired from the correspondence between type parameters and priority levels as shown in Table 3. The acquired priority level 2 corresponding to the type parameter "non-modality", the acquired priority level 2 corresponding to the type parameter "background-sent", and the acquired priority level 1 corresponding to the type parameter "time effectiveness" are added up, to obtain a priority level 5 of the popup window message "notification message".

For still another example, according to type parameters "modality, foreground-triggered, and non-time-effectiveness" that correspond to the popup window message "Do you want to close it?", a priority level 1 corresponding to the type parameter "modality", a priority level 1 corresponding to the type parameter "foreground-triggered" and a priority level 2 corresponding to the type parameter "non-time-effectiveness" are acquired from the correspondence between type parameters and priority levels as shown in Table 3. The acquired priority level 1 corresponding to the type parameter "modality", the acquired priority level 1 corresponding to the type parameter "foreground-triggered", and the acquired priority level 2 corresponding to the type parameter "non-time effectiveness" are added up, to obtain a priority level 4 of the popup window message "Do you want to close it?"

Each time the terminal receives a popup window message that is sent by the server or generates a popup window message according to a click command received from a user, the terminal sets a priority level for the popup window message according to operations in the foregoing steps 201 to 204.

After a priority level is set for each popup window message that is not displayed by means of operations in the foregoing steps 201 to 204, a most important popup window message is selected by means of an operation in the following step 205, and the popup window message is displayed.

Step 205: Load a popup window message with a highest priority level into a popup window, and display the popup window.

The popup window message with the highest priority level is the most important.

This step is specifically as follows: comparing priority levels of the popup window messages that are not displayed, acquiring a popup window message with a highest priority level among the popup window messages that are not displayed, and acquiring a display level relationship between the popup window message with the highest priority level and a currently displayed interface; creating a popup window; loading the popup window message with the highest priority level into the created popup window; and displaying the popup window according to the display level relationship between the popup window message with the highest priority level and the currently displayed interface.

The display level relationship represents an arrangement sequence of interfaces that are currently displayed on the terminal. It may be specified that, if a value of a display level of an interface is larger, the interface is arranged at a more front position. Alternatively, it may be specified that, if a value of a display level of an interface is smaller, the interface is arranged at a more front position. During development of an application, a skilled person sets a display level relationship between display interfaces in the application.

For example, it is specified that a smaller value of a priority level indicates a higher priority level. Comparison is performed on the priority level 6 of the popup window message "confirm the order", the priority level 5 of the popup window message "notification message" and the priority level 4 of the popup window message "Do you want to close it?", to acquire the popup window message "Do you want to close it?" with the highest priority level among the popup window messages "confirm the order", "notification message" and "Do you want to close it?" that are not displayed. A display level relationship between the popup window message "Do you want to close it?" with the highest priority level and a currently displayed interface is acquired. It is assumed that the acquired display level relationship is that a display level of the popup window message "Do you want to close it?" is 1, and a display level of the currently displayed interface is 2. Assuming that it is specified that an interface is arranged at a more front position if a value of a display level of the interface is smaller, the popup window message "Do you want to close it?" shall be arranged in front of the currently displayed interface. A popup window is created, and the popup window message "Do you want to close it?" with the highest priority level is loaded into the created popup window. The popup window is displayed according to the display level 1 of the popup window message "Do you want to close it?" and the display level 2 of the currently displayed interface. As shown in FIG. 2-2, the popup window is located in front of the currently displayed interface.

According to different display forms, popup windows may be classified into two types, that is, modal popup windows and non-modal popup windows. For a modal popup window, when a user intends to perform operation on an application program outside the popup window, the user needs to respond to the popup window first, for example, click a button such as "OK" or "Cancel" to close the popup window. Therefore, during display of popup windows, only one modal popup window can be displayed each time, while one or more non-modal popup windows can be displayed each time.

After the popup window message is displayed by means of operations in the foregoing steps 201 to 205, a display state of the displayed popup window message further needs to be recorded by means of operations in the following step 206, to help another process inquire the display state of the popup window message.

Step 206: Record a display state of the popup window, monitor the displayed popup window in real time, and update the display state of the popup window when the state of the popup window changes.

Specifically, a display state of the popup window is recorded, and a popup window message displayed in the popup window and the display state of the popup window are stored in a correspondence between popup window messages and display states. The displayed popup window is monitored, and when the state of the popup window changes, the display state corresponding to the popup window in the correspondence between popup window messages and display states is updated.

For example, a display state "being displayed" of the popup window is recorded, and a popup window message "Do you want to close it?" displayed by the popup window and the display state "being displayed" of the popup window are stored in a correspondence between popup window messages and display states as shown in Table 4. The displayed popup window is monitored, and when the state of the popup window changes, for example, when the popup window is being destroyed, the display state corresponding to the popup window in the correspondence between popup window messages and display states as shown in Table 4 is updated to "being destroyed". An updated correspondence between popup window messages and display states is as shown in Table 5.

TABLE 4

| Popup window message | Display state |
| --- | --- |
| Do you want to close it? | Being displayed |
| . . . | . . . |

TABLE 5

| Popup window message | Display state |
| --- | --- |
| Do you want to close it? | Being destroyed |
| . . . | . . . |

After the popup window is displayed and the display state of the popup window is recorded by means of the foregoing steps 205 and 206, some processes may need to communicate with a process of the popup window, input data to the process of the popup window, or acquire data from the process of the popup window. For example, after the terminal displays the popup window message "Do you want to close it?", a process of saving page data needs to access the process of the popup window message "Do you want to close it?", information on saved page data is acquired from the process of the popup window message "Do you want to close it?", and the page data is saved according to the acquired information.

When a process that communicates with the popup window submits a request for accessing the popup window to the terminal, the terminal receives the request, and determines whether to allow the process to access the popup window by means of operations in the following step 207.

Step 207: View a display state of the popup window when a request, which is submitted by a process communicating with the popup window, for accessing the popup window is received, and determine, according to the display state of the popup window, whether to allow the process to access the popup window.

Specifically, when a request, which is submitted by a process communicating with the popup window, for accessing the popup window is received, a corresponding display state is acquired from a correspondence between popup window messages and display states and according to a popup window message displayed in the popup window. If the acquired display state is "being displayed", the process is allowed to access the popup window. If the acquired display state is "being destroyed" or "already destroyed", the request submitted by the process for accessing the popup window is rejected.

For example, it is assumed that the process communicating with the popup window is a process of saving page data. When a request, which is submitted by the process of saving page data, for accessing the popup window is received, a corresponding display state is acquired from the correspondence between popup window messages and display states as shown in Table 4 and according to a popup window message "Do you want to close it?" displayed in the popup window. If it is found that the display state of the popup window is "being displayed", the process of saving page data is allowed to access the popup window.

If a display state of a currently displayed popup window message is "already destroyed", a most important popup window message is further acquired from the popup window messages that are not displayed according to operations in the foregoing steps 205 and 206. The most important popup window message is displayed, and a display state of the popup window message is recorded.

In this embodiment of the present disclosure, a trigger condition of each popup window message that is not displayed is acquired; a priority level of each popup window message that is not displayed is set separately according to the trigger condition of each popup window message that is not displayed; and a popup window message with a highest priority level is loaded into a popup window, and the popup window is displayed. Because a priority level of each popup window message that is not displayed is set according to a trigger condition of each popup window message, it is ensured that a more important popup window message has a higher priority level. Then, a popup window message with a highest priority level is displayed, so that one most important popup window message may be selected from popup window messages that are not displayed, and the most important popup window message is displayed preferentially.

Embodiment 3

Figure 3:
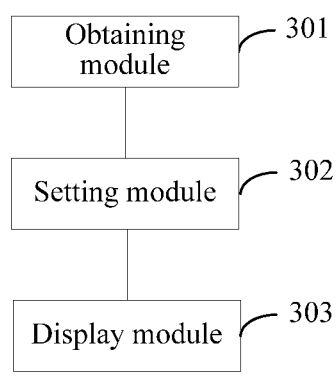
FIG. 3 is a schematic structural diagram of an apparatus for displaying a popup window message according to Embodiment 3 of the present disclosure.

Referring to FIG. 3, this embodiment of the present disclosure provides an apparatus for displaying a popup window message, including: an obtaining module 301, configured to acquire a trigger condition of each popup window message that is not displayed; a setting module 302, configured to separately set, according to the trigger condition of each popup window message that is not displayed, a priority level of each popup window message that is not displayed; and a display module 303, configured to load a popup window message with a highest priority level into a popup window, and display the popup window.

The setting module 302 includes: a first acquisition unit, configured to acquire, according to the trigger condition of each popup window message that is not displayed, at least one type parameter corresponding to each popup window message that is not displayed; and a setting unit, configured to separately set, according to the at least one type parameter corresponding to each popup window message that is not displayed, a priority level of each popup window message that is not displayed.

The first acquisition unit is configured to acquire, from a correspondence between trigger conditions and type parameters and according to the trigger condition of each popup window message that is not displayed, at least one type parameter corresponding to each popup window message that is not displayed.

The setting unit includes: an acquisition subunit, configured to acquire a corresponding priority level from a correspondence between type parameters and priority levels and according to at least one type parameter that corresponds to a first popup window message, the first popup window message being any popup window message among the popup window messages that are not displayed; and a setting subunit, configured to set the acquired priority level as a priority level of the first popup window message.

The display module 303 includes: a second acquisition unit, configured to acquire a popup window message with a highest priority level, and a display level relationship between the popup window message with the highest priority level and a currently displayed interface; a creation and loading unit, configured to create a popup window, and load the popup window message into the created popup window; and a display unit, configured to display the popup window according to the display level relationship between the popup window message with the highest priority level and the currently displayed interface.

Further, the display module 303 further includes: a receiving unit, configured to receive a request for accessing the popup window, the request being sent by a process communicating with the popup window; a viewing unit, configured to view a display state of the popup window; and a determining unit, configured to determine, according to the display state of the popup window, whether to allow the process to access the popup window.

Further, the display module 303 further includes: a recording unit, configured to record a display state of the popup window; and an updating unit, configured to monitor the popup window in real time, and update the display state of the popup window when it is detected that the state of the popup window changes.

In this embodiment of the present disclosure, a trigger condition of each popup window message that is not displayed is acquired; a priority level of each popup window message that is not displayed is set separately according to the trigger condition of each popup window message that is not displayed; and a popup window message with a highest priority level is loaded into a popup window, and the popup window is displayed. Because a priority level of each popup window message that is not displayed is set according to a trigger condition of each popup window message, it is ensured that a more important popup window message has a higher priority level. Then, a popup window message with a highest priority level is displayed, so that one most important popup window message may be selected from popup window messages that are not displayed, and the most important popup window message is displayed preferentially.

Figure 4:
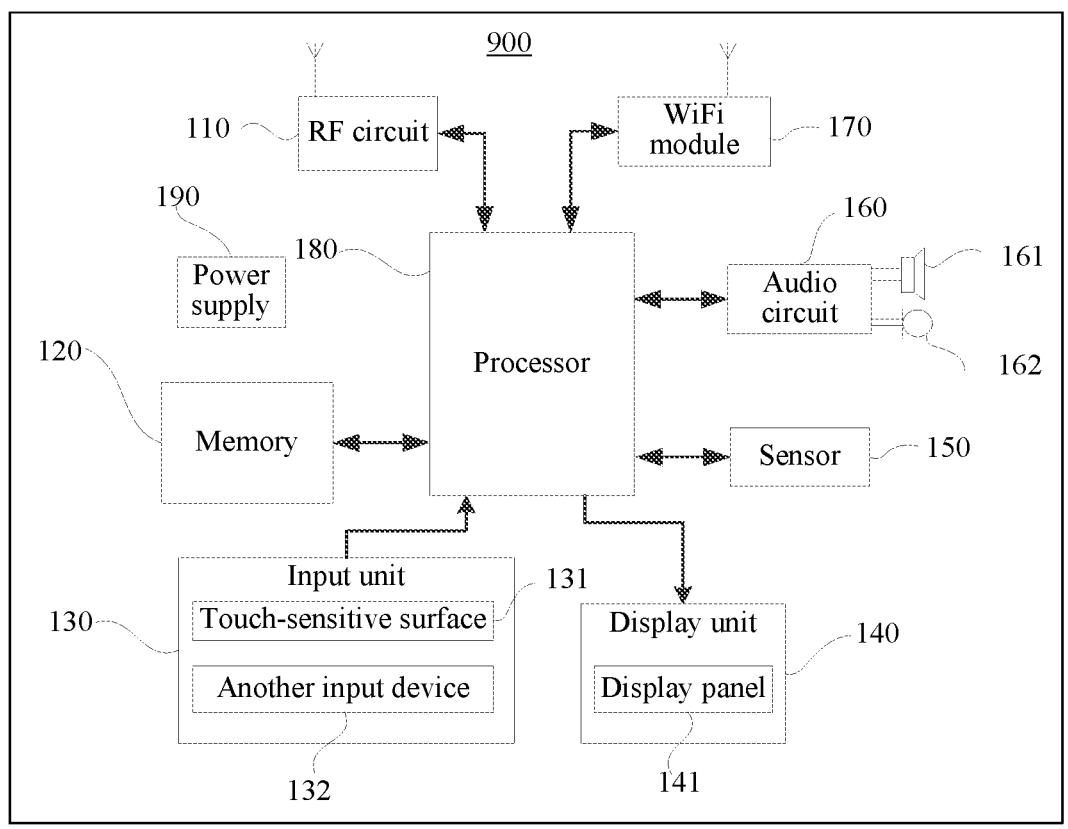
FIG. 4 is a schematic structural diagram of a terminal according to Embodiment 4 of the present disclosure.

Refer to FIG. 4, which shows a schematic structural diagram of a terminal with a touch-sensitive surface involved in this embodiment of the present disclosure. The terminal may be configured to implement a method for displaying a popup window message according to the foregoing embodiments.

The terminal 900 may include a radio frequency (RF) circuit 110, a memory 120 having one or more computer-readable storage media, an input unit 130, a display unit 140, a sensor 150, an audio circuit 160, a wireless fidelity (WiFi) module 170, a processor 180 including one or more processing cores, a power supply 190, and the like. A person skilled in the art may understand that the structure of the terminal shown in FIG. 4 does not constitute a limitation to the terminal, and the terminal may include more components or fewer components than those shown in the figure, or some components may be combined, or a different component deployment may be used.

The RF circuit 110 may be configured to receive and send signals during an information receiving and sending process, or a call process. Particularly, the RF circuit 110 receives downlink information from a base station, then delivers the information to the processor 180 including one or more processing cores for processing, and sends related uplink data to the base station. Generally, the RF circuit 110 includes but is not limited to an antenna, at least one amplifier, a tuner, one or more oscillators, a subscriber identity module (SIM) card, a transceiver, a coupler, a low noise amplifier (LNA), a duplexer, and the like. In addition, the RF circuit 110 may also communicate with a network and another device by wireless communications. The wireless communications may use any communications standard or protocol, which includes but is not limited to: Global System of Mobile Communication (GSM), General Packet Radio Service (GPRS), Code Division Multiple Access (CDMA), Wideband Code Division Multiple Access (WCDMA), Long Term Evolution (LTE), Email, Short Messaging Service (SMS), and the like.

The memory 120 may be configured to store a software program and module. The processor 180 runs the software program and module stored in the memory 120, to implement various functional applications and data processing. The memory 120 may include a program storage area and a data storage area. The program storage area may store an operating system, an application program required by at least one function (such as a sound playback function, and an image display function), and the like. The data storage area may store data (such as audio data, and an address book) created according to use of the terminal 900, and the like. In addition, the memory 120 may include a high speed random access memory, and may also include a non-volatile memory such as at least one magnetic disk storage device, a flash memory, or another volatile solid-state storage device. Accordingly, the memory 120 may further include a memory controller, so as to provide access to the memory 120 for the processor 180 and the input unit 130.

The input unit 130 may be configured to receive input digit or character information, and generate an input of a keyboard signal, a mouse signal, a joystick signal, an optical signal, or a track ball signal related to the user setting and function control. Specifically, the input unit 130 may include a touch-sensitive surface 131 and another input device 132. The touch-sensitive surface 131, which may also be referred to as a touch screen or touch panel, may be configured to collect a touch operation of a user on or near the touch-sensitive surface (such as an operation of a user on or near the touch-sensitive surface 131 by using any suitable object or accessory, such as a finger or a stylus), and drive a corresponding connection apparatus according to a preset program. Alternatively, the touch-sensitive surface 131 may include two parts: a touch detection apparatus and a touch controller. The touch detection apparatus detects the touch position of a user, detects a signal generated by the touch operation, and transmits the signal to the touch controller. The touch controller receives the touch information from the touch detection apparatus, converts the signal into touch point coordinates, and sends the touch point coordinates to the processor 180. Moreover, the touch controller may receive and execute a command sent from the processor 180. In addition, the touch-sensitive surface 131 may be a resistive, capacitive, infrared, or surface sound wave type touch-sensitive surface. In addition to the touch-sensitive surface 131, the input unit 130 may further include the another input device 132. Specifically, the another input device 132 may include, but is not limited to, one or more of a physical keyboard, a functional key (such as a volume control key and a switch key), a track ball, a mouse, and a joystick.

The display unit 140 may be configured to display information input by a user or provided for a user, and various graphic user interfaces of the terminal 900. The graphic user interfaces may consist of a graph, a text, an icon, a video and any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transmits the touch operation to the processor 180, so as to determine the type of the touch event. Then, the processor 180 provides a corresponding visual output on the display panel 141 according to the type of the touch event. Although in FIG. 4, the touch-sensitive surface 131 and the display panel 141 are used as two separate components to implement input and output functions, in some embodiments, the touch-sensitive surface 131 and the display panel 141 may be integrated to implement the input and output functions.

The terminal 900 may further include at least one sensor 150, for example, an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the terminal 900 is moved to the ear. As one type of motion sensor, a gravitational acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the terminal 900, are not further described herein.

The audio circuit 160, a loudspeaker 161, and a microphone 162 may provide audio interfaces between the user and the terminal 900. The audio circuit 160 may convert received audio data into an electric signal and transmit the electric signal to the loudspeaker 161. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, to provide communication between a peripheral earphone and the terminal 900.

WiFi is a short distance wireless transmission technology. The terminal 900 may help, by using the WiFi module 170, a user to receive and send e-mails, browse a web page, access streaming media, and so on, which provides wireless broadband Internet access for the user. Although FIG. 4 shows the WiFi module 170, it may be understood that the WiFi module is not a necessary component of the terminal 900, and when required, the WiFi module may be omitted as long as the scope of the essence of the present disclosure is not changed.

The processor 180 is the control center of the terminal 900, and is connected to various parts of the mobile phone by using various interfaces and lines. By running or executing the software program and/or module stored in the memory 120, and invoking data stored in the memory 120, the processor 180 performs various functions and data processing of the terminal 900, thereby performing overall monitoring on the mobile phone. Optionally, the processor 180 may include one or more processing cores. Preferably, the processor 180 may integrate an application processor and a modem. The application processor mainly processes an operating system, a user interface, an application program, and the like. The modem mainly processes wireless communications. It may be understood that the foregoing modem may also not be integrated into the processor 180.

The terminal 900 further includes the power supply 190 (such as a battery) for supplying power to the components. Preferably, the power supply may be logically connected to the processor 180 by using a power management system, thereby implementing functions such as charging, discharging and power consumption management by using the power management system. The power supply 190 may further include one or more direct current or alternating current power supplies, a recharging system, a power failure detection circuit, a power adapter or an inverter, a power status indicator, and any other component.

Although not shown in the figure, the terminal 900 may further include a camera, a Bluetooth module, and the like, which are not further described herein. Specifically, in some embodiments, a display unit 140 of the terminal 900 may be a touch-screen display, and the terminal 900 may further include a memory 120 and one or more computer programs. The one or more computer programs may be referred to as units or modules throughout the present disclosure. The one or more computer programs are stored in the memory 120, and are configured to be executed by one or more processors 180. The one or more computer programs include computer instructions used for performing the following operations: acquiring a trigger condition of each popup window message that is not displayed; separately setting, according to the trigger condition of each popup window message that is not displayed, a priority level of each popup window message that is not displayed; and loading a popup window message with a highest priority level into a popup window, and displaying the popup window.

Further, the one or more computer programs include computer instructions used for performing separately setting, according to the trigger condition of each popup window message that is not displayed, a priority level of each popup window message that is not displayed includes: acquiring, according to the trigger condition of each popup window message that is not displayed, at least one type parameter corresponding to each popup window message that is not displayed; and separately setting, according to the at least one type parameter corresponding to each popup window message that is not displayed, a priority level of each popup window message that is not displayed.

Preferably, the acquiring, according to the trigger condition of each popup window message that is not displayed, at least one type parameter corresponding to each popup window message that is not displayed includes: acquiring, from a correspondence between trigger conditions and type parameters and according to the trigger condition of each popup window message that is not displayed, at least one type parameter corresponding to each popup window message that is not displayed.

Preferably, the separately setting, according to the at least one type parameter corresponding to each popup window message that is not displayed, a priority level of each popup window message that is not displayed includes: acquiring a corresponding priority level from a correspondence between type parameters and priority levels and according to at least one type parameter that corresponds to a first popup window message, the first popup window message being any popup window message among the popup window messages that are not displayed; and setting the acquired priority level as a priority level of the first popup window message.

Preferably, the loading a popup window message with a highest priority level into a popup window, and displaying the popup window includes: acquiring a popup window message with a highest priority level, and a display level relationship between the popup window message with the highest priority level and a currently displayed interface; creating a popup window, and loading the popup window message into the created popup window; and displaying the popup window according to the display level relationship between the popup window message with the highest priority level and the currently displayed interface.

Further, the loading a popup window message with a highest priority level into a popup window, and displaying the popup window further includes: receiving a request for accessing the popup window, the request being sent by a process communicating with the popup window; viewing a display state of the popup window; and determining whether to allow the process to access the popup window according to the display state of the popup window.

Further, the loading a popup window message with a highest priority level into a popup window, and displaying the popup window further includes: recording a display state of the popup window; and monitoring the popup window in real time, and updating the display state of the popup window when it is detected that the state of the popup window changes.

In the above embodiment of the present disclosure, a trigger condition of each popup window message that is not displayed is acquired; a priority level of each popup window message that is not displayed is set separately according to the trigger condition of each popup window message that is not displayed; and a popup window message with a highest priority level is loaded into a popup window, and the popup window is displayed. Because a priority level of each popup window message that is not displayed is set according to a trigger condition of each popup window message, it is ensured that a more important popup window message has a higher priority level. Then, a popup window message with a highest priority level is displayed, so that one most important popup window message may be selected from popup window messages that are not displayed, and the most important popup window message is displayed preferentially.

A person of ordinary skill in the art may understand that, all or some of the steps of the foregoing embodiments may be implemented by hardware or a program instructing relevant hardware. The program may be stored in a computer-readable storage medium. The storage medium may be a read-only memory, a magnetic disk, an optical disc, or the like.

The above descriptions are merely preferred embodiments of the present disclosure, and are not intended to limit the present disclosure. Any modification, equivalent replacement and improvement made within the spirit and principle of the present disclosure shall fall within the protection scope of the present disclosure.

What is claimed is:

1. A method for displaying a popup window message, comprising:

receiving, by a terminal, the popup window message sent by a server and inserting the popup window message into a message queue;

after receiving a plurality of popup window messages and inserting the plurality of popup window messages into the message queue, setting a priority level for each popup window message that is not displayed in the message queue, comprising:

acquiring, by the terminal, a trigger condition of each popup window message that is not displayed, wherein each popup window message that is not displayed in the message queue has different trigger condition;

classifying the plurality of popup window messages into a plurality of categories according to a plurality of classification standards, wherein the plurality of classification standards include display forms of the plurality of popup window messages, sources of the plurality of popup window messages, and time effectiveness of the plurality of popup window messages, each of the plurality of popup window messages is classified into one of the plurality of categories according to one of the plurality of classification standards, and each popup window message is assigned with at least one corresponding type parameter indicating a category of the plurality of categories that the popup window is classified into, wherein different type parameters have different importance degrees corresponding to different priority levels;

separately setting, by the terminal according to the trigger condition of each popup window message that is not displayed, the priority level of each popup window message that is not displayed; and loading, by the terminal, the popup window message with a highest priority level into a popup window, and displaying the popup window;

wherein the separately setting, according to the trigger condition of each popup window message that is not displayed, the priority level of each popup window message that is not displayed comprising:

acquiring, according to the trigger condition of each popup window message that is not displayed, the at least one type parameter corresponding to each popup window message that is not displayed, wherein each popup window message corresponds to one of the plurality of classification standards; and setting, according to the at least one type parameter corresponding to each popup window message that is not displayed, a priority level of each popup window message that is not displayed.

2. The method according to claim 1, wherein the acquiring, according to the trigger condition of each popup window message that is not displayed, at least one type parameter corresponding to each popup window message that is not displayed comprises:
   acquiring, from a correspondence between trigger conditions and type parameters and according to the trigger condition of each popup window message that is not displayed, at least one type parameter corresponding to each popup window message that is not displayed.

3. The method according to claim 1, wherein the setting, according to the at least one type parameter corresponding to each popup window message that is not displayed, a priority level of each popup window message that is not displayed comprises:
   acquiring a corresponding priority level from a correspondence between type parameters and priority levels and according to at least one type parameter that corresponds to a first popup window message, the first popup window message being any popup window message among the popup window messages that are not displayed; and
   setting the acquired priority level as a priority level of the first popup window message.

4. The method according to claim 1, wherein the loading a popup window message with a highest priority level into a popup window, and displaying the popup window, comprises:
   acquiring a popup window message with a highest priority level, and a display level relationship between the popup window message with the highest priority level and a currently displayed interface;
   creating a popup window, and loading the popup window message into the created popup window; and
   displaying the popup window according to the display level relationship between the popup window message with the highest priority level and the currently displayed interface.

5. The method according to claim 1, wherein after the loading a popup window message with a highest priority level into a popup window, and displaying the popup window, the method further comprises:
   receiving a request for accessing the popup window, the request being sent by a process communicating with the popup window;
   viewing a display state of the popup window; and
   determining, according to the display state of the popup window, whether to allow the process to access the popup window.

6. The method according to claim 1, wherein the method further comprises:
   recording a display state of the popup window; and
   monitoring the popup window in real time, and updating the display state of the popup window when it is detected that the state of the popup window changes.

7. A terminal comprising:
   a processor and a memory, the memory storing computer program modules and units for displaying a popup window message, the computer program modules and units being executable by the processor and further comprising:
   an obtaining module, configured to:
   receive the popup window message sent by a server and insert the popup window message into a message queue;
   after receiving a plurality of popup window messages and inserting the plurality of popup window messages into the message queue, set a priority level for each popup window message that is not displayed in the message queue, comprising:
   acquire a trigger condition of each popup window message that is not displayed, and classify a plurality of popup window messages into a plurality of categories according to a plurality of classification standards, wherein the plurality of classification standards include display forms of the plurality of popup window messages, sources of the plurality of popup window messages, and time effectiveness of the plurality of popup window messages, each of the plurality of popup window messages is classified into one of the plurality of categories according to one of the plurality of classification standards, and each popup window message is assigned with at least one corresponding type parameter indicating a category of the plurality of categories that the popup window is classified into wherein different type parameters have different importance degrees corresponding to different priority levels;
   a setting module, configured to separately set, according to the trigger condition of each popup window message that is not displayed, the priority level of each popup window message that is not displayed; and
   a display module, configured to load the popup window message with a highest priority level into a popup window, and display the popup window, wherein the setting module further comprises:
   a first acquisition unit, configured to acquire, according to the trigger condition of each popup window message that is not displayed, the at least one type parameter corresponding to each popup window message that is not displayed, wherein each popup window message corresponds to one of the plurality of classification standards; and
   a setting unit, configured to separately set, according to the at least one type parameter corresponding to each popup window message that is not displayed, a priority level of each popup window message that is not displayed separately.

8. The terminal according to claim 7, wherein the first acquisition unit is configured to acquire, from a correspondence between trigger conditions and type parameters and according to the trigger condition of each popup window message that is not displayed, at least one type parameter corresponding to each popup window message that is not displayed.

9. The terminal according to claim 7, wherein the setting unit comprises:
   an acquisition subunit, configured to acquire a corresponding priority level from a correspondence between type parameters and priority levels and according to at least one type parameter that corresponds to a first popup window message, the first popup window message being any popup window message among the popup window messages that are not displayed; and
   a setting subunit, configured to set the acquired priority level as a priority level of the first popup window message.

10. The terminal according to claim 7, wherein the display module comprises:
    a second acquisition unit, configured to acquire a popup window message with a highest priority level, and a display level relationship between the popup window message with the highest priority level and a currently displayed interface;

a creation and loading unit, configured to create a popup window, and load the popup window message into the created popup window; and a display unit, configured to display the popup window according to the display level relationship between the popup window message with the highest priority level and the currently displayed interface.

11. The terminal according to claim 7, wherein the display module further comprises:

a receiving unit, configured to receive a request for accessing the popup window, the request being sent by a process communicating with the popup window;

a viewing unit, configured to view a display state of the popup window; and a determining unit, configured to determine, according to the display state of the popup window, whether to allow the process to access the popup window.

12. The terminal according to claim 7, wherein the display module further comprises:

a recording unit, configured to record a display state of the popup window; and an updating unit, configured to monitor the popup window in real time, and update the display state of the popup window when it is detected that the state of the popup window changes.

* * * * *